Dec. 14, 1937.  C. A. TEA  2,102,392
WEATHER STRIP
Filed March 27, 1936  2 Sheets-Sheet 1
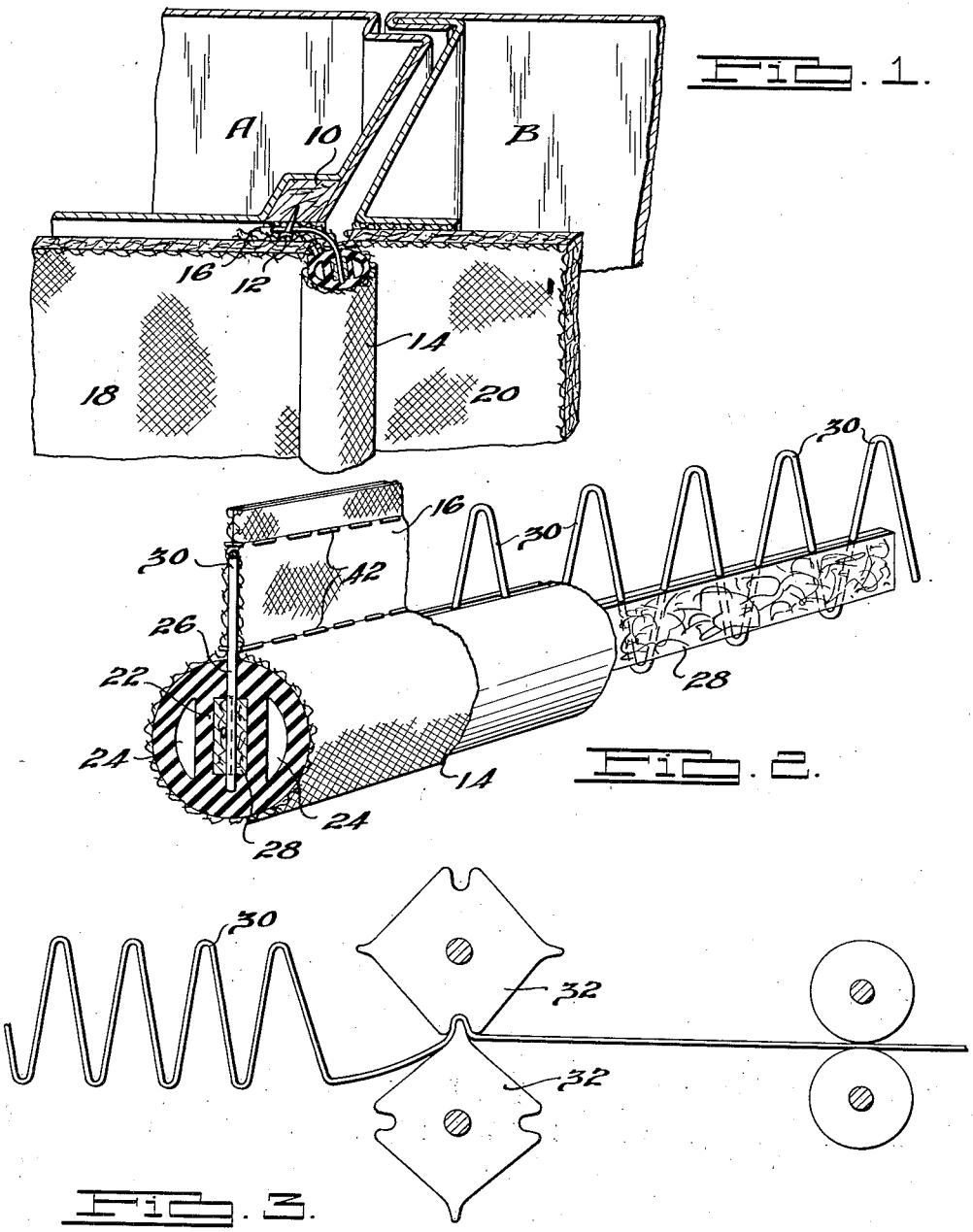
INVENTOR.
Clark A. Tea.
BY
Harness, Lind, Patee & Harris
ATTORNEYS.

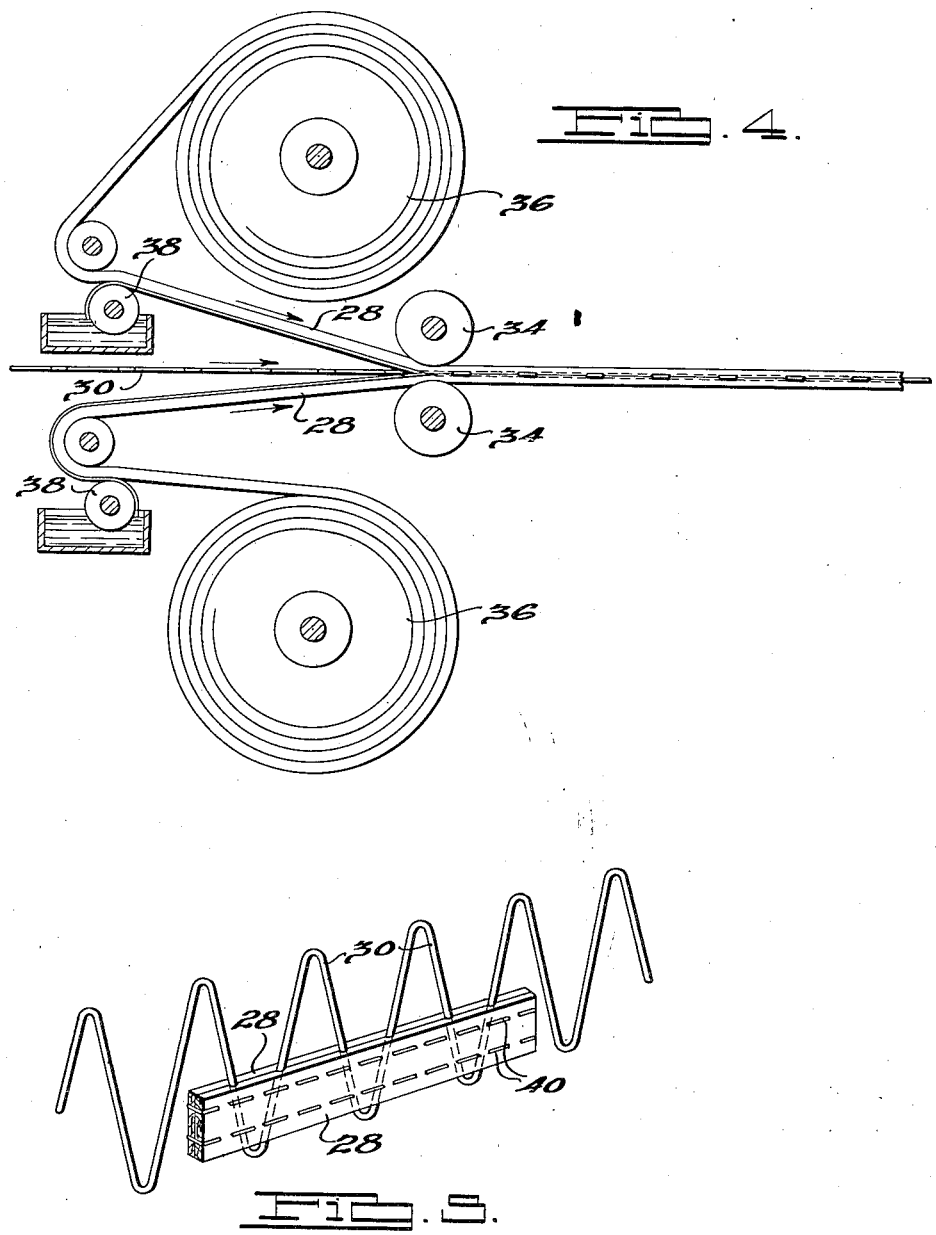

Patented Dec. 14, 1937

2,102,392

UNITED STATES PATENT OFFICE 2,102,392

WEATHER STRIP

Clark A. Tea, Detroit, Mich., assignor to Chrysler Corporation, Highland Park, Mich., a corporation of Delaware Application March 27, 1936, Serial No. 71,125

2 Claims. (Cl. 20—69)

This invention relates to a weatherstrip and more particularly to a weatherstrip especially adapted for use on motor vehicle bodies to seal the opening around the doors or windows, and to the method of making the same.

An object of the invention is to provide a weatherstrip which is strong, inherently resilient and inexpensive to manufacture.

Another object of the invention is to provide a weatherstrip, the parts of which are easily assembled and retained in assembled position by stitching.

A further object of the invention is to provide a weatherstrip which is free to bend laterally in applying the same to a curved opening.

A further object of the invention is to provide a weatherstrip which has sufficient resiliency to cause it to tightly engage the door or window for sealing purposes and yet adapted to take a permanent set when bent beyond its elastic limit so that in applying the weatherstrip to an opening it may be bent beyond its elastic limit to conform to any irregularities around the opening, and after being bent to that position possesses sufficient resiliency to flex within given limits.

More specifically stated, the invention consists in applying a resilient wire to the central portion of a cushioning part of the weatherstrip and extending the wire into an attaching portion so that the parts are connected together in such a manner that relative bending movement is resiliently resisted.

Other objects and advantages of the invention will be more fully understood from the following description taken in connection with the accompanying drawings, in which:

Fig. 1 is a perspective view, parts being broken away and in section, of one application of the device as applied to an automobile door opening.

Fig. 2 is a perspective view of the weatherstrip alone, parts thereof being broken away and in section.

Fig. 3 is a diagrammatic view illustrating the method of bending a continuous strip of wire into zigzag formation.

Fig. 4 is a diagrammatic view illustrating the method of securing re-inforcements to the zigzag wire.

Fig. 5 illustrates a modified form of the attaching means for the re-inforcing portion of the wire.

Referring to the drawings, I have illustrated a portion of the automobile body frame at A and a door at B. The frame is provided with a tacking insert 10 to which the weatherstrip is secured, such as by tacks 12.

The weatherstrip comprises a cushioning member 14 and an attached flanged tacking strip 16, the latter being secured to the tacking insert 10. As illustrated, a panel member 18 is secured to the frame A overlapping the flanged tacking strip 16. The inner panel of the door is shown at 20.

Referring to Fig. 2, the cushioning member 14 of the weatherstrip is provided with one or more recesses at its center, at 22 and 24, the recess 22 being provided for the reception of the reinforcing member and the recesses 24 being provided to make the cushioning material more pliable. This cushioning member is preferably made of a soft material such as rubber and is split longitudinally as at 26 to permit the insertion of a reinforcing member 28 and a wire 30.

In order to provide a securing portion and to give the cushioning member more rigidity and to provide sufficient flexibility, I have preformed a wire into zigzag shape, having portions bent back on itself and arranged in a substantially flat plane. A reinforcing strip 28 is secured to the opposite faces at one edge of the wire and these parts thus assembled are arranged in the recess 22.

Referring to Fig. 3, a continuous strip of wire is passed through a pair of rolling die members 32 which alternately bend the wire into the zigzag formation shown in Figs. 2 and 3. The wire thus formed is then passed through suitable rollers 34 with the reinforcing material, such as compressed paper, which is brought from rollers 36 to the opposite sides of the wire where it is adhesively secured to the wire, as shown in Fig. 4.

The strips 28 may be secured to the wire by cement and the same is applied to the strip by rollers 38 rotating in a pot of glue and contacting one surface of the strip. It will be understood that the two strips of reinforcing material 28 are secured together between the spaces of the looped wire so that the wire is held by the reinforcements in a predetermined position.

As shown in Fig. 5, the reinforcing strips 28 may be secured to the wire by stitching, as shown at 40.

It is important to select a wire having a deflection characteristic which, when bent within limits, is elastic but when bent beyond its limits takes a base set and is elastic from that bent position. This is important when the weatherstrip is applied to an irregular surface. For example, the strip may be manually bent beyond its elastic limit to fit an irregular surface but when so bent it is elastic from that bent position. I have found that a wire suitable for this purpose should have an elastic limit between 250,000 lbs. per square inch and 350,000 lbs. per square inch and may be formed from what is commonly termed music wire having a diameter of approximately one sixty-fourth of an inch.

After the wire 30 and its attached reinforcing member 28 is inserted in the slot 26 with the reinforcing member 28 in the recess 22, a covering of fabric material is applied to the cushion member 14 and the outwardly extending portion of the wire 30 by stitching, as shown at 42. It will be understood that by forming the wire into the zigzag shape as shown, it is readily possible to bend the weatherstrip in any direction such as is required in securing the strip to a curved surface or in going around the corner of the door opening, or the like.

Although but several specific embodiments of the invention have herein been shown and described, it will be understood that various changes in the size, shape and arrangement of parts may be made without departing from the spirit of my invention.

What is claimed is:

1. A weatherstrip comprising a pliable member of materially greater longitudinal dimension than its thickness, a continuous strip of wire bent into connected loops in a substantially flat plane partially within the area of said member, and extending longitudinally thereof, and securing means carried by said strip within the area of said member.

2. A weatherstrip comprising a pliable member substantially circular in cross section and of materially greater longitudinal dimension than its cross sectional dimension having a longitudinally extending recess within its area connected by a slot extendng from the recess to the outer surface of said member, a continuous strip of wire bent into connected loops in a substantially flat plane, a body portion secured to one edge portion of said strip within the recess of said member, the remaining portion of said strip extending through the slot of said member and beyond the outer surface of said member.

CLARK A. TEA.